United States Patent
Kim et al.

(10) Patent No.: US 11,070,327 B2
(45) Date of Patent: *Jul. 20, 2021

(54) METHOD AND APPARATUS FOR RE-TRANSMITTING MMT PACKET AND METHOD AND APPARATUS FOR REQUESTING MMT PACKET RE-TRANSMISSION

(71) Applicants: Electronics and Telecommunications Research Institute, Daejeon (KR); YONSEI UNIVERSITY WONJU INDUSTRY-ACADEMIC COOPERATION FOUNDATION, Wonju-si (KR)

(72) Inventors: Chang Ki Kim, Daejeon (KR); Kwang Deok Seo, Wonju-si (KR); Jeong Ju Yoo, Daejeon (KR); Jin Woo Hong, Daejeon (KR)

(73) Assignees: Electronics and Telecommunications Research Institute, Daejeon (KR); Yonsei University Wonju Industry-Academic Cooperation Foundation, Wonju-si (KR)

( * ) Notice: Subject to any disclaimer, the term of this patent is extended or adjusted under 35 U.S.C. 154(b) by 69 days.

This patent is subject to a terminal disclaimer.

(21) Appl. No.: 16/691,013

(22) Filed: Nov. 21, 2019

(65) Prior Publication Data
US 2020/0092051 A1    Mar. 19, 2020

Related U.S. Application Data

(63) Continuation of application No. 16/121,926, filed on Sep. 5, 2018, now Pat. No. 10,523,376, which is a
(Continued)

(30) Foreign Application Priority Data

Jan. 9, 2014 (KR) .................. 10-2014-0002874
Mar. 27, 2014 (KR) .................. 10-2014-0036084
(Continued)

(51) Int. Cl.
*H04L 1/18* (2006.01)
*H04L 12/841* (2013.01)
*H04L 12/825* (2013.01)

(52) U.S. Cl.
CPC .......... *H04L 1/1896* (2013.01); *H04L 1/1825* (2013.01); *H04L 1/1838* (2013.01);
(Continued)

(58) Field of Classification Search
None
See application file for complete search history.

(56) References Cited

U.S. PATENT DOCUMENTS 7,502,818 B2    3/2009  Kohno et al.
2002/0054578 A1*  5/2002  Zhang .................. H04L 1/0001
                                                       370/328
(Continued)

FOREIGN PATENT DOCUMENTS

KR    2011-0089034 A    8/2011
WO    WO 2013/077697 A1    5/2013
(Continued)

OTHER PUBLICATIONS

Bucciol, P., et al, "Cross-layer perceptual ARQ for video communications over 802.11 e wireless networks," Advances in Multimedia, vol. 2007.1, Oct. 2007 (13 pages in English).
(Continued)

*Primary Examiner* — Kodzovi Acolatse
(74) *Attorney, Agent, or Firm* — NSIP Law

(57) ABSTRACT

The present invention discloses a method of re-transmission of a lost MMT packet by a packet transmission apparatus.
(Continued)

The method includes generating a media processing unit (MPU) based on a media fragment unit (MFU) and generating an MMT asset by encapsulating the MPU; generating an MMT packet based on the MPU included in the generated MMT asset; and transmitting the generated MMT packet, wherein the method further comprises adding, in a signaling message related to re-transmission of the MMT packet, delay_constrained_ARQ_flag to indicate whether or not the MMT packet transmission apparatus supports a delay-constrained automatic repeat request (ARQ) function.

12 Claims, 15 Drawing Sheets

Related U.S. Application Data continuation of application No. 15/110,854, filed as application No. PCT/KR2015/000098 on Jan. 6, 2015, now Pat. No. 10,097,319.

(30) Foreign Application Priority Data

| Oct. 21, 2014 | (KR) | 10-2014-0142389 |
|---|---|---|
| Jan. 5, 2015 | (KR) | 10-2015-0000447 |

(52) U.S. Cl.
CPC .......... *H04L 1/1864* (2013.01); *H04L 47/26* (2013.01); *H04L 47/283* (2013.01)

(56) References Cited

U.S. PATENT DOCUMENTS

| 2007/0079222 A1* | 4/2007 | Kure ............. H04L 1/1816 714/776 |
|---|---|---|
| 2011/0188390 A1 | 8/2011 | Kwag et al. |
| 2014/0007172 A1 | 1/2014 | Rhyu et al. |
| 2014/0118618 A1* | 5/2014 | Ranatunga ............ G16H 40/67 348/518 |
| 2014/0314080 A1* | 10/2014 | Park ............... H04L 65/4092 370/391 |
| 2014/0317674 A1* | 10/2014 | Hwang ............. H04N 21/631 725/118 |
| 2014/0334504 A1 | 11/2014 | Yie et al. |
| 2014/0344875 A1 | 11/2014 | Bae |
| 2015/0095727 A1 | 4/2015 | Cho et al. |
| 2017/0141800 A1 | 5/2017 | Bisplinghoff et al. |
| 2017/0141880 A1* | 5/2017 | So ........................ H04L 1/08 |

FOREIGN PATENT DOCUMENTS

| WO | WO 2013/109094 A1 | 7/2013 |
|---|---|---|
| WO | WO 2013/187667 A1 | 12/2013 |

OTHER PUBLICATIONS

Podolsky, M. et al., "Soft ARQ for layered streaming media," Journal of VLSI Signal Processing, vol. 27, Feb. 2001 (20 pages in English).
Wu, D., et al., "Streaming video over the Internet: Approaches and directions," IEEE Transactions on Circuits and Systems for Video Technology, vol. 11, No. 3, Mar. 2001, (20 pages in English).
ISO/IEC DIS 23008-1, "High efficiency coding and media delivery in heterogeneous environments—Part 1: MPEG Media Transport (MMT)," Apr. 2013 (98 pages in English).
ISO/IEC 23008-1 AMD 1, "Study of ISO/IEC 23008-1 DAM 1 Additional technologies for MPEG Media Transport," document No. ISO/IEC/SC29/WG11, San Jose, CA, Jan. 2014 (35 pages in English).
International Search Report issued in counterpart International Application No. PCT/KR2015/000098 (3 pages in Korean).

* cited by examiner

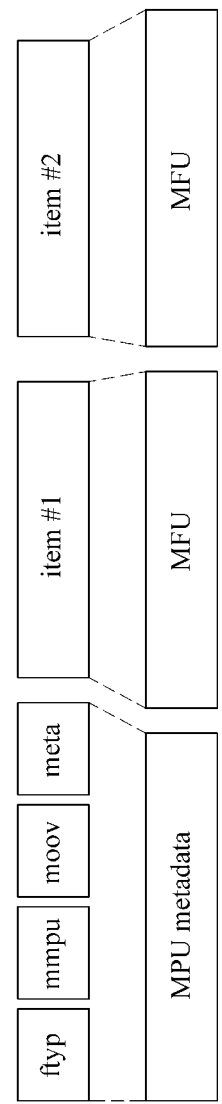

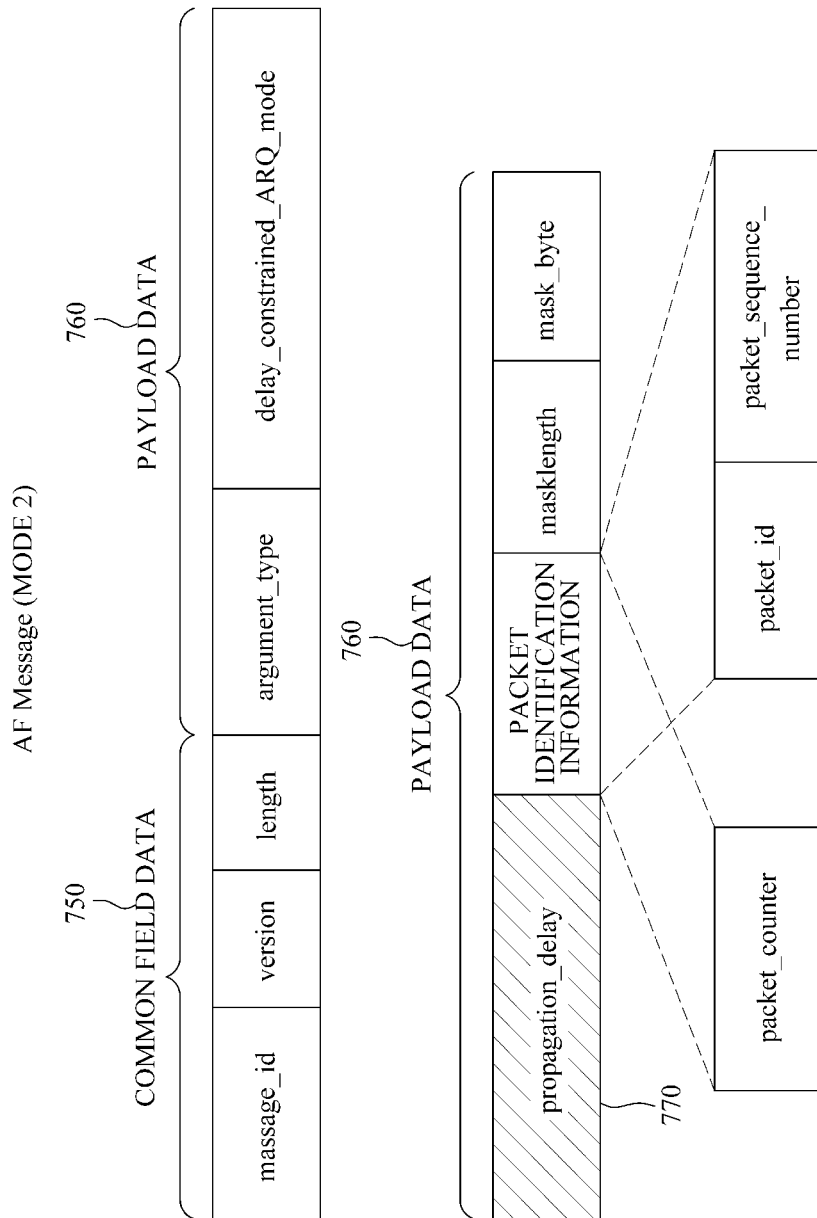

METHOD AND APPARATUS FOR RE-TRANSMITTING MMT PACKET AND METHOD AND APPARATUS FOR REQUESTING MMT PACKET RE-TRANSMISSION

CROSS-REFERENCE TO RELATED APPLICATIONS

This application is a continuation of application Ser. No. 16/121,926 filed on Sep. 5, 2018, which is a continuation of application Ser. No. 15/110,854 filed on Jul. 11, 2016, now U.S. Pat. No. 10,097,319 issued on Oct. 9, 2018, which claims the benefit under 35 USC 119(a) of PCT Application No. PCT/KR2015/000098, filed on Jan. 6, 2015, which claims the benefit of Korean Patent Application Nos. 10-2014-0002874 filed Jan. 9, 2014, 10-2014-0036084 filed Mar. 27, 2014, 10-2014-0142389 filed Oct. 21, 2014, and 10-2015-0000447 filed Jan. 5, 2015, in the Korean Intellectual Property Office, the entire disclosures of which are incorporated herein by reference for all purposes.

TECHNICAL FIELD

The present invention relates to a method and apparatus for re-transmitting a packet, and more specifically, a method and apparatus for re-transmitting a packet that has been lost during transmission in a system based on MPEG media transport (MMT) technology, and a method and apparatus for requesting re-transmission of said packet.

BACKGROUND ART

MPEG media transport (MMT) as a standardized data transmission technology defines formats for transporting coded data. According to MMT, a receiving apparatus has a feature that enables it to issue an automatic repeat request (ARQ), whereby re-transmission of an MMT packet that was lost during transmission can be requested.

According to the existing packet re-transmission scheme, when a transmitted packet is lost, a receiving apparatus determines whether to send an ARQ feedback message to a transmission apparatus (e.g., a server), assuming that said receiving apparatus already has information regarding the round-trip time (RTT). Said receiving apparatus takes into consideration the information it has regarding the RTT, and then sends out a request for re-transmission of the lost packet. In other words, considering the fact that the RTT is an estimation of the time it will take to receive the lost packet, the receiving apparatus may still send the ARQ feedback message even when the re-transmitted packet has arrived to the receiving apparatus after the RTT if it is determined that the received packet can be effectively utilized; otherwise, the receiving apparatus may not send out the ARQ feedback message.

FIG. 1 is a diagram illustrating a conventional method, oriented to a receiving entity, for re-transmitting a packet.

Referring to FIG. 1, in a case where a packet, which is referred to as 'packet 2', was transmitted from a transmission apparatus 110 but has been lost, a receiving apparatus 120 may determine whether to request re-transmission of packet 2 by taking into consideration its RTT. The receiving apparatus 120 will send out an ARQ feedback message to request re-transmission of packet 2 if it is determined that the re-transmitted packet 2 that arrives at the receiving apparatus 120 after the RTT can be effectively used; otherwise, the receiving apparatus 120 does not send out the ARQ feedback message. FIG. 1 illustrates an example in which the requested packet 2 arrives at the receiving apparatus 120 after the RTT has elapsed since a request was made for re-transmission of said packet; the re-transmitted packet can be effectively utilized only when its arrival time does not exceed $T_d(2)$.

As such, in the conventional re-transmitting method, a packet may be useful if the receiving apparatus has obtained an estimation of the RTT. However, in a media transport system environment based on the real-time transport protocol (RTP) and MMT protocol, it is not a receiving apparatus but a transmission apparatus that obtains an estimate of the RTT. Therefore, the conventional packet re-transmission method based on RTT estimations by the receiving apparatus cannot be applied to an MMT-based service environment.

DETAILED DESCRIPTION OF THE INVENTION

Technical Problem

To solve the aforementioned drawback, one objective of the present invention is to provide a sending-entity-oriented, packet re-transmission method and apparatus that may be effectively utilized by a sending entity in a MMT-based system environment, assuming that the sending entity knows the RTT.

Another objective of the present invention is to provide a method and apparatus that may be applied to a receiving entity with the purpose that said receiving entity may support the sending entity's estimation of the RTT.

Yet another objective of the present invention is to provide a method and apparatus for setting up an ARQ configuration (AC) and an ARQ feedback (AF) message so that the receiving entity may request re-transmission of a packet while aware of whether the sending entity supports a delay-constrained ARQ function.

Technical Solution

The present invention provides a method of an MPEG media transport (hereinafter referred to as an "MMT") packet transmission apparatus for re-transmitting a lost packet, the method including: generating a media processing unit (hereinafter referred to as an "MPU") based on a media fragment unit (hereinafter referred to as an "MFU") and generating an MMT asset by encapsulating the MPU; generating an MMT packet based on the MPU included in the generated MMT asset; and transmitting the generated MMT packet, wherein the method further comprises adding, in a signaling message related to re-transmission of the MMT packet, delay_constrained_ARQ_flag to indicate whether the MMT packet transmission apparatus supports a delay-constrained automatic repeat request (hereinafter, referred to as an "ARQ") function.

If the MMT packet transmission apparatus supports the delay-constrained ARQ function, the delay_constrained_ARQ_flag may be set to "1," and if the MMT packet transmission apparatus does not support the delay-constrained ARQ function, the delay_constrained_ARQ_flag may be set to "0."

An ARQ configuration (hereinafter, referred to as an "AC") message may be transmitted including the delay_constrained_ARQ_flag.

The method may further include, if the MMT packet transmission apparatus supports the delay-constrained ARQ function, receiving an ARQ feedback (hereinafter, referred to as an "AF") message from a receiving apparatus to request re-transmission with respect to a lost packet, estimating a round-trip time (hereinafter, referred to as an "RTT"), and determining whether to transmit the packet requested to be re-transmitted.

The determining of whether to transmit the requested packet may include receiving the AF message; updating an RTT based on timing information contained in the AF message; and determining whether to transmit the requested packet based on the updated RTT.

The timing information contained in the AF message may include: ARQ_feedback_timestamp that records a network time protocol (NTP) time which corresponds to the moment of delivery time of the AF message; or propagation_delay that indicates a difference between an NTP time at a moment of delivery of a packet and an NTP time at a moment of packet arrival.

The AF message may include arrival_deadline along with the ARQ_feedback_timestamp.

The RTT may be updated by calculating an ARQ feedback delay time based on a difference between the ARQ_feedback_timestamp and an arrival time of the AF message.

If the updated RTT does not exceed the arrival_deadline, the packet requested to be re-transmitted may be transmitted to the packet receiving apparatus, and if the updated RTT exceeds the arrival_deadline, the requested packet may not be transmitted.

The RTT may be updated based on the propagation_delay, and if the updated RTT does not exceed fixed_end_to_end_delay, the requested packet may be transmitted to the packet receiving apparatus, and if the updated RTT exceeds the fixed_end_to_end_delay, the requested packet may not be transmitted.

The present invention also provides an MMT packet transmission apparatus for re-transmitting a lost packet, the MMT packet transmission apparatus including: an MMT encapsulator configured to generate an MPU based on an MFU and to generate an MMT asset by encapsulating the MPU; and an MMT packet generator configured to generate an MMT packet based on the MPU contained in the generated MMT asset, wherein delay_constrained_ARQ_flag is included in a signaling message related to re-transmission of the MMT packet to be transmitted, in order to indicate whether the MMT packet transmission apparatus supports a delay-constrained ARQ function.

The present invention also provides a method of an MMT packet receiving apparatus for requesting re-transmission of a lost packet, the method including: receiving an MMT packet; generating an MMT asset by depacketizing the received MMT packet; generating an MPU by decapsulating the MMT asset and generating an MFU based on the MPU, wherein the method further includes requesting re-transmission of the lost packet by generating an AF message based on delay_constrained_ARQ_flag that indicates whether or not a packet transmission apparatus supports a delay-constrained ARQ function.

If the delay_constrained_ARQ_flag indicates that the packet transmission apparatus supports the delay-constrained ARQ function, timing information may be included in the AF message to allow for calculation of an RTT that is required by the packet transmission apparatus when determining whether to transmit a packet requested to be re-transmitted, and the AF message may be transmitted to the packet transmission apparatus.

The timing information may include: ARQ_feedback_timestamp that records a NTP time which corresponds to a delivery time of the AF message; or propagation_delay that indicates a difference between an NTP time at a moment of delivery of a packet and an NTP time at a moment of packet arrival.

The AF message may further include arrival_deadline to indicate an arrival deadline of the lost packet to be retransmitted as well as the ARQ_feedback_timestamp.

The arrival_deadline may be calculated based on play time and decoding time of data which is to be played earlier than the lost packet, the play time and decoding time being stored beforehand in a receiver buffer.

The arrival_deadline may be calculated by dividing an amount of the data in the receiver buffer by an average bitrate for packet stream.

The arrival_deadline may be represented as a time increment starting from the ARQ_feedback_timestamp.

In order to indicate the lost packet, packet_counter to count transmitted packets may be further included in the AF message, or both packet_id and packet_sequence_number to indicate each packet with the packet_id may be further included in the AF message, wherein the packet_id is assigned to each asset in order to distinguish packets of different assets from each other.

The present invention also provides an MMT packet receiving apparatus for requesting re-transmission of a lost packet, the MMT packet receiving apparatus including: a receiver configured to receive an MMT packet; a depacketizer configured to generate an MMT asset by depacketizing the received MMT packet; and a decapsulator configured to generate an MPU by decapsulating the MMT asset and to generate an MFU based on the MPU, wherein the MMT packet receiving apparatus further includes an AF message generator configured to request re-transmission of the lost packet by generating an AF message based on delay_constrained_ARQ_flag that indicates whether or not a packet transmission apparatus supports a delay-constrained ARQ function.

Advantageous Effects

According to the method and apparatus for re-transmitting an MMT packet, as well as a method and apparatus for requesting re-transmission, it is possible to prevent, in advance, the re-transmission of a packet that is to arrive at a receiving apparatus if said packet is scheduled to arrive after an effective arrival time, thereby reducing the amount of unnecessary traffic flowing in a network.

DESCRIPTION OF DRAWINGS

FIGS. 4A and 4B are diagrams illustrating media fragmentation in a delivery functional area.

FIG. 7B is a diagram explaining a format of an AF message used for a packet re-transmission method in accordance with a second exemplary embodiment of the present invention.

MODE FOR INVENTION

Figure 1:
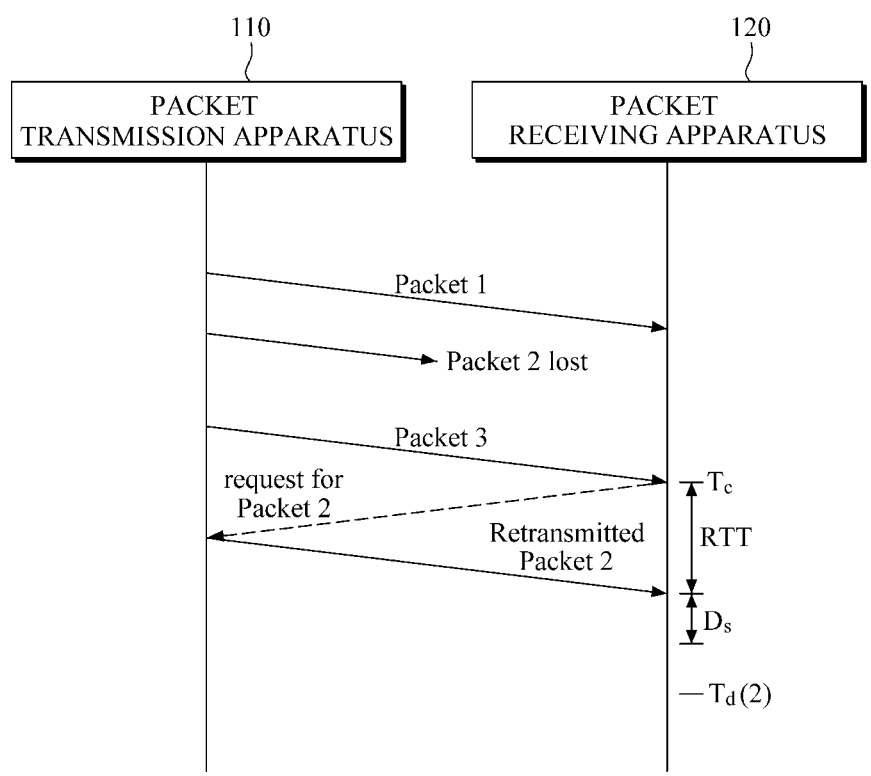
FIG. 1 is a diagram illustrating a conventional method, oriented to a receiving entity, for re-transmitting a packet.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. As used herein, the term "and/or" includes any and all combinations of one or more of the associated listed items.

It is understood that when one element or component is described as being "connected to" or "coupled to" or "access" another element or component, it can be directly connected or coupled to, or access the other element or component, or intervening elements or components may be present. In contrast, when an element is referred to as being "directly connected" or "directly coupled" to another element, there are no intervening elements present.

As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention now will be described more fully hereinafter with reference to the accompanying figures, in which embodiments of the invention are shown. Like reference numerals in the drawings denote like elements, and thus their description will be omitted.

Definition of Terms

Hereinafter, terms used herein will be defined as below.

A content component or a media component is defined as a media of a single type or a subset of the media of a single type, and may be, for example, a video track, movie subtitles, or an enhancement layer of video.

Content is defined as a group of content components, and may be, for example, a movie, a song, and the like.

Presentation is defined as an operation performed by one or more devices to allow a user to experience one content component or one service (e.g., movie-watching).

A service is defined as one or more content components that are transmitted for presentation or storage.

Service information is defined as metadata that describes a kind of service, as well as characteristics and components of said service.

An access unit (AU) is the smallest data unit with which information regarding timing may be associated.

With respect to coded media data with no designated timing for decoding and presentation, AU is not defined.

An MMT asset is logical data entity that is composed of one or more MPUs with the same MMT asset ID, or a specific chunk of data with a format that has been defined by other standards. An MMT asset is the largest data unit to which the same presentation information to said MMT asset's MPUs and transport characteristics are applied.

MMT Asset Delivery Characteristics (MMT-ADC) is a description about QoS requirements for delivery of MMT assets. MMT presentation information (MMT PI) describes the spatial and temporal relationships among MMT assets for consumption. A combination of HTML5 and composition information (CI) may be configured as an example of the presentation information. A media fragment unit (MFU) is a generic container that is independent of any specific codec and contains coded media data that is independently consumable by a media decoder. The MFU is smaller or the same size as the access unit (AU) and contains information that can be utilized by delivery layers.

An MMT package is a logically structured collection of data, which is composed of one or more MMT assets, MMT-PI, MMT-asset delivery characteristics (ADC), and descriptive information.

An MMT packet is a format of data that is generated or consumed by MMT protocol.

An MMT payload format is a format of payload for MMT package or an MMT signaling message to be delivered by an MMT protocol or Internet application layer protocols (e.g., RTP).

A media processing unit (MPU) is a generic container that is independent of any specific media codec, containing at least one AU along with additional delivery and consumption related information. For non-timed data, MPU contains a portion of data without AU boundaries. The MPU is coded media data that can be completely and independently processed, whereby in this context, the term 'processed' means encapsulation or packetization into an MMT packet for delivery.

Non-timed data defines all data elements that are consumed at non-specified times. The non-timed data may have a time frame during which the data is available to be executed or launched.

Timed data defines a data element that is associated with a specific time for decoding and presentation.

Hierarchical Structure of MMT

Figure 2:
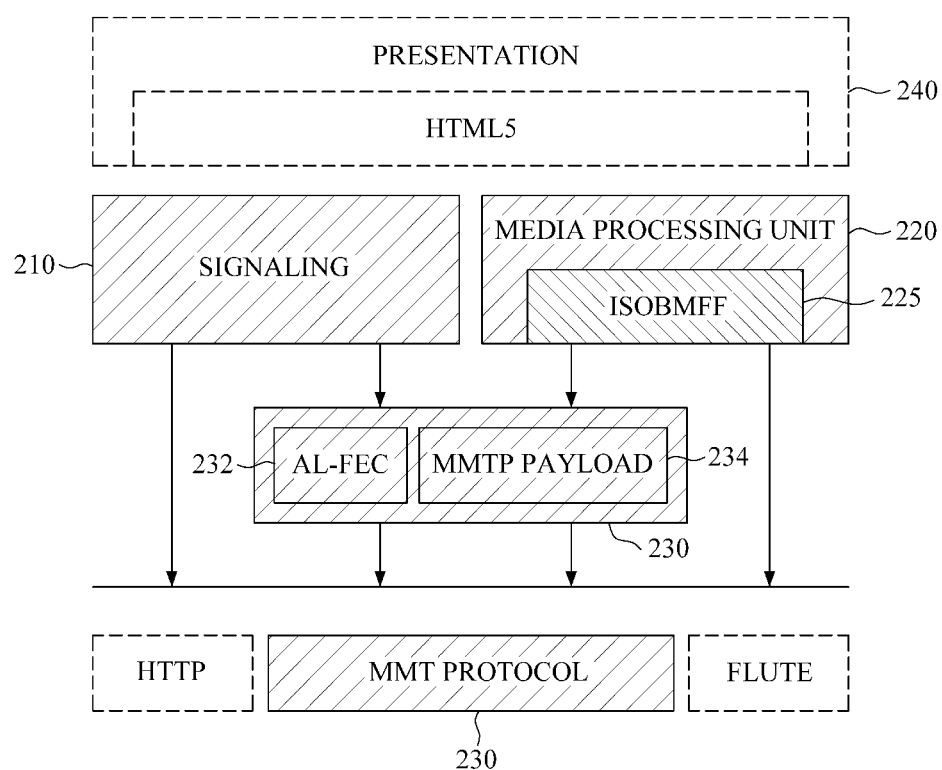
FIG. 2 is a conceptual diagram for explaining functional areas of MPEG media transport (MMT).

FIG. 2 is a conceptual diagram for explaining functional areas of MMT.

Referring to FIG. 2, MMT technology may include a signaling functional area 210 that handles signaling messages for operation and control of a system; a media processing unit (MPU) functional area 220 that handles a logical structure and a physical file format of media data to be transmitted and stored; a delivery functional area 230 in which methods to deliver all types of data (e.g., media data and signaling messages) are processed; and a presentation area 240 in which playback of media data is processed. MMT standards define, except the presentation area, the signaling functional area 210, the media processing unit functional area 220, and the delivery functional area 230 (including MMT protocol).

The signaling functional area 210 defines formats of signaling message to manage consumption and delivery of media data. Signaling messages for consumption management may provide information required for consuming transmitted media data. Signaling messages for consumption management may be used to signal the package structure, while signaling messages for delivery management may be used to signal the structure of payload format and protocol configuration.

AL-FEC message may provide composition information about AL-FEC that is used to prevent quality degradation which is caused by asset loss during the asset delivery process. In addition, several signaling messages may be defined in the signaling functional area. An ARQ configuration (AC) message and an ARQ feedback (AF) message may be, respectively, used to set an ARQ operation method of a receiving entity and to request re-transmission of a lost MMTP packet. A measurement configuration (MC) message may be used to measure reception quality of media data and configure a method for reporting the measurement result, and a reception quality feedback (RQF) message may be used to report a measurement result of end-to-end reception quality. A hypothetical receiver buffer model (HRBM) message may be used to set up HRBM operations, conveying information regarding end-to-end delivery delay and memory requirements for effective operations in a unidirectional broadcasting environment.

The delivery functional area 230 defines MMT protocol (MMTP) required for delivering data between sending and receiving entities and AL-FEC operation 232 for data repair. The MMT protocol is an application layer protocol that operates over the conventional protocol, such as UTP or IP, providing a function for transmitting packages through a packet switching network (PSN) of various types. Particularly, the delivery functional area may define an MMTP payload 234 and a structure of an MMTP packet, and supports several features, such as multiplexing between assets, measuring jitter for the purpose of synchronization during delivery across various heterogeneous networks, and issuing an automatic repeat request (ARQ). The MMTP payload 234 acts as a bridgehead to each of the other functional areas 210 and 220, and encapsulates a signaling message or media data. The structure of the MMTP payload 234 may vary depending on the type of data to be delivered or a delivery method, and may be classified into three different modes: MPU mode, generic file delivery (GFD) mode, and signaling message mode.

First, the MPU mode may provide a function for streaming an ISOBMFF-based file 225, that is, MPU. In the MPU mode, for efficient delivery, multiple small MPUs may be aggregated into a single MMTP payload 234, and a large MPU may be fragmented into metadata and data to create a different MMTP payload 234. Fragmentation of MPU is referred to as media-aware fragmentation, and it will be described in detail with reference to FIGS. 4A and 4B.

The GFD mode provides a function for generic file download and delivers the file as an individual entity regardless of the file's type or size. The signaling message mode may provide a function for delivering signaling messages in binary or XML format.

The presentation area 240 provides a function for processing presentation information (PI) that relates to playback time and location of the delivered asset or MPU, whereby an MPU timestamp descriptor that contains network time protocol (NTP)-based playback timing of MPU may be provided as basic PI. Furthermore, besides said timing information, composition information (CI), as high-level presentation information that comprises spatial information regarding playback of the asset, may be defined in MMT CI.

The MPU functional area 220 may define data models, such as a package, an asset, or the like. A package is the largest entity among the data models defined by the MPU functional area 220 and may refer to a single, independent content, such as a movie. The package will be described in detail with reference to FIG. 3.

Structure of MMT Package

Figure 3:
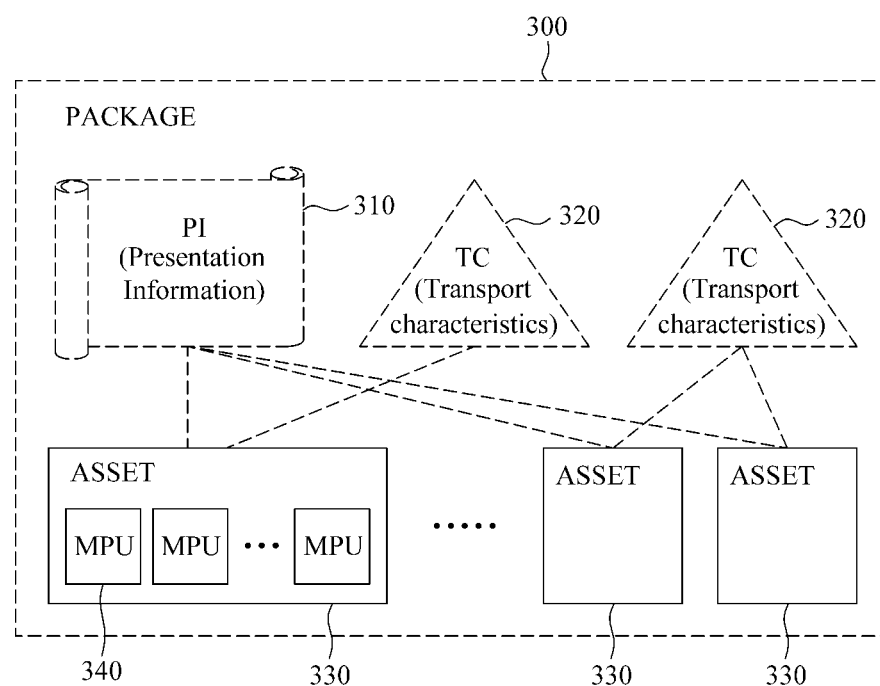
FIG. 3 is a conceptual diagram for describing a structure of an MMT package.

FIG. 3 is a conceptual diagram for describing a structure of an MMT package.

Referring to FIG. 3, a package 300 is a logical entity consisting of various entities and is composed of assets 330, transport characteristics (TC) 320, and PI 310. The asset 330 is a logical entity to distinguish elements, such as images or audio, that constitute content, and may consist of one or more MPUs 340 with the same asset ID. The MPU 340 is a physical file in accordance with ISO base media file format (BMFF) and may be a media data file that contains various metadata which can be independently processed. An MFU (not shown), which is a media data portion of the MPU 340 exclusive of metadata, is a sample (or a sub-sample) or item of media data, and fragmentation may be carried out with reference to MMT hint tracks embedded in the MPU 340. The TC 320 that can be described in XML includes QoS requirements for seamless delivery of assets; and asset characteristics information which includes loss tolerance of each asset, sensitivity to jitter, the maximum buffer size required for receiving assets, and the like. Although not defined in the MPU functional area, the PI 310 is information contained in the package 300, and is required for playback of the package 300, providing information about playback time or playback space, which is required for playback of the assets 330.

MMT Media Fragmentation

Figure 4A:
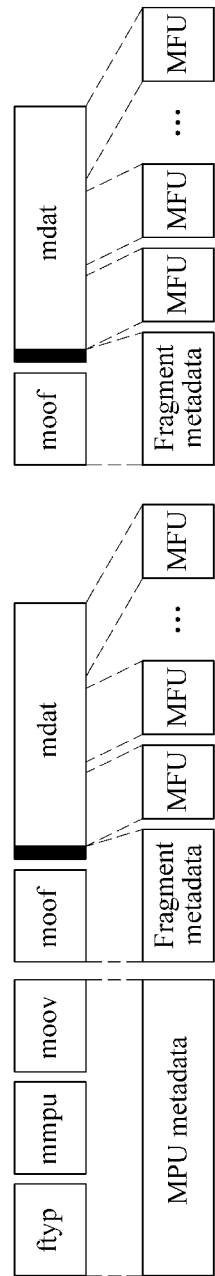

FIGS. 4A and 4B are diagrams illustrating media fragmentation in a delivery functional area. FIG. 4A illustrates a payload generation process for timed media, and FIG. 4B illustrates a payload generation process for non-timed media.

Referring to FIG. 4A, the packetization of MPU that contains timed media may be performed in an MPU format aware mode or MPU format agnostic mode. In the media format agnostic mode, the MPU is packetized, by using GFD mode, into either data units of equal size or a predefined size according to the size of the maximum transport unit (MTU) of the delivery network. In other words, the packetization in the MPU format agnostic mode may only consider the size of data to be carried in the packet. A type field for an MMTP packet header may indicate whether the packetization is in format agnostic mode or not. In the format agnostic mode, the packetization procedure takes into account boundaries of different types of data in MPU to generate packets using the MPU mode. The resulting packets may carry delivery data units of one of the following: MPU metadata, fragment metadata, and MFU.

Referring to FIG. 4B, non-timed media data may be packetized in two different modes. In the MPU format agnostic mode, the MPU is packetized into a packet containing delivery data units of either MPU metadata or MFU by using the MPU mode.

Packet Re-Transmission Method

Figure 5:
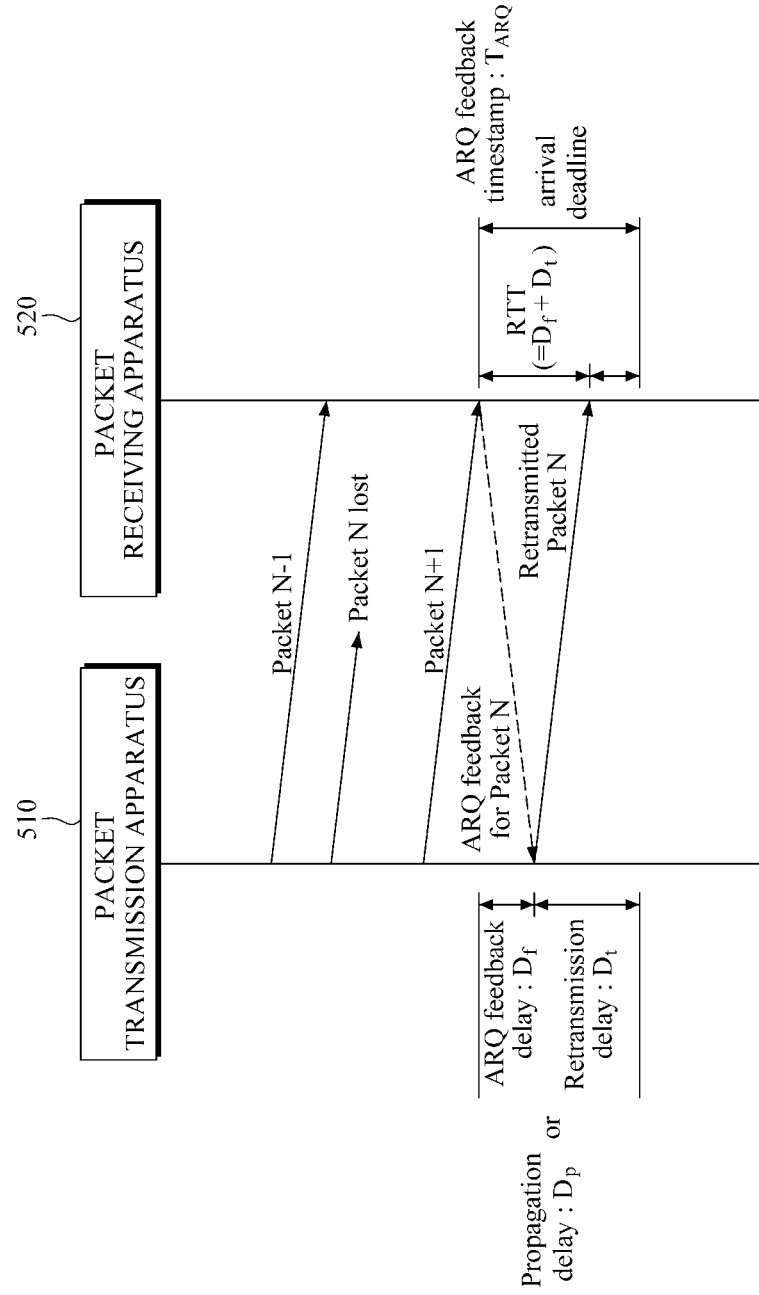
FIG. 5 is a flowchart illustrating a method for re-transmitting a packet in accordance with an exemplary embodiment of the present invention.

FIG. 5 is a flowchart illustrating a method for re-transmitting a packet in accordance with an exemplary embodiment of the present invention.

In FIG. 5, a packet transmission apparatus 510 may transmit one or more packets consecutively to a packet receiving apparatus 520. Here, the packet transmission apparatus 510 is an entity that generates a packet by processing multiple media fragment units (MFUs) and transmits the resulting packet to the packet receiving apparatus 520, including any type of apparatus that has communication features and data processing capabilities. The packet receiving apparatus 520 is an entity that consumes content by generating and decoding MFU based on the received packet, including any type of apparatus with communication features and data processing capabilities. For example, the packet transmission apparatus 510 may be broadcasting equipment, a server system, a smartphone, a personal computer (PC), a tablet PC, a laptop, a personal digital assistant (PDA), or the like. The packet receiving apparatus 520 is a client terminal and may include a smartphone, a PC, a tablet PC, a laptop, a PDA, or the like.

The packet transmission apparatus 510 may estimate a round-trip time (RTT) by utilizing a measurement configuration (MC) message and a reception quality feedback (RQF) message.

Referring to FIG. 5, the packet transmission apparatus 510 may have RTT information beforehand by utilizing the RQF message. In the case where packet N is lost during the transmission, the packet receiving apparatus 520 sends an ARQ feedback (AF) message to the packet transmission apparatus 510 to request retransmission of the lost packet N.

In one exemplary embodiment, the AF message may contain an ARQ feedback timestamp that indicates the NTP time at the moment of delivery of the AF message and may also contain the arrival deadline that indicates a time frame that the re-transmitted packet may arrive in order for said packet to be valid. The packet transmission apparatus 510 that has received the AF message that contains such information determines, based on the already-known RTT, whether re-transmission of requested packet is viable. In other words, based on the RTT, the packet transmission apparatus 510 may determine whether or not the packet to be re-transmitted will arrive at the packet receiving apparatus by the arrival deadline. If the RTT is a significantly large value, the packet transmission apparatus 510 determines that the re-transmitted packet cannot arrive at the packet receiving apparatus within the predetermined arrival deadline, and thus does not transmit the packet. Otherwise, the packet transmission apparatus 510 transmits the packet that has been requested.

Hereinafter, an algorithm for determining re-transmission of a packet in the packet transmission apparatus 510 will be described. In FIG. 5, the ARQ feedback timestamp is utilized to update the RTT to the latest value based on an estimation that the packet transmission apparatus has already acquired. Once receiving the AF message, the packet transmission apparatus measures the time at which the AF message arrived, and may calculate an ARQ feedback delay if there is a difference between the measured arrival time and the ARQ feedback timestamp. As shown in FIG. 5, the RTT is the sum of the ARQ feedback delay time $D_f$ and the re-transmission delay time $D_r$, whereby the most up-to-date value of RTT may be obtained by using the latest ARQ feedback delay time. The arrival deadline, as depicted in FIG. 5, means a deadline by which the re-transmitted packet has to arrive at the packet receiving apparatus. Therefore, a packet that arrives after the deadline is regarded as meaningless data for the playback of real-time media. In other words, the re-transmission of the requested packet is determined through a comparison between the updated RTT and the arrival deadline. Such a method for re-transmission of a packet is referred to as a delay-constrained ARQ scheme. The packet transmission apparatus 510 may transmit a delay-constrained ARQ flag to the packet receiving apparatus 520 by including said flag in an AC message in order to inform the packet receiving apparatus 520 of whether the packet transmission apparatus 510 supports the delay-constrained ARQ scheme or not. This process is carried out to help the packet receiving apparatus 520 determine whether it should include information regarding the timing of delivery and delay of a packet, since said information will be provided to the packet transmission apparatus 510 to support the delay-constrained ARQ function therein. In the case where the delay-constrained ARQ function is not supported, an AF message may not need to include an ARQ feedback timestamp and arrival deadline, thereby making it possible to prevent an occurrence of unnecessary network traffic.

In another exemplary embodiment, the packet receiving apparatus 520 may transmit propagation delay to the packet transmission apparatus 510 by including the propagation delay in the AF message. Propagation delay indicates the NTP time difference between the moment of delivery of a packet and the actual arrival time of the packet. The difference may be an average of multiple propagation delays measured within duration. The packet transmission apparatus 510 may calculate the RTT using one or more propagation delays. The packet transmission apparatus 510 may determine whether to re-transmit the requested packet by comparing previously known fixed end-to-end delay, which is contained in an HRBM message, with the propagation delay. At this time, the packet transmission apparatus 510 may also transmit the delay-constrained ARQ flag to the packet receiving apparatus 520 by including said flag in the AC message.

In the case where the ARQ feedback timestamp is transmitted, an arrival deadline should also be included in the AF message and transmitted, and in the case where propagation delay is transmitted, the arrival deadline may not need to be included in the message. Selecting between the two modes may be performed by the packet receiving apparatus 510, whereby the selection criteria may be according to the configurations specified to each apparatus. The configurations may be changed by a user via user interface.

AC Message Format

Figure 6:
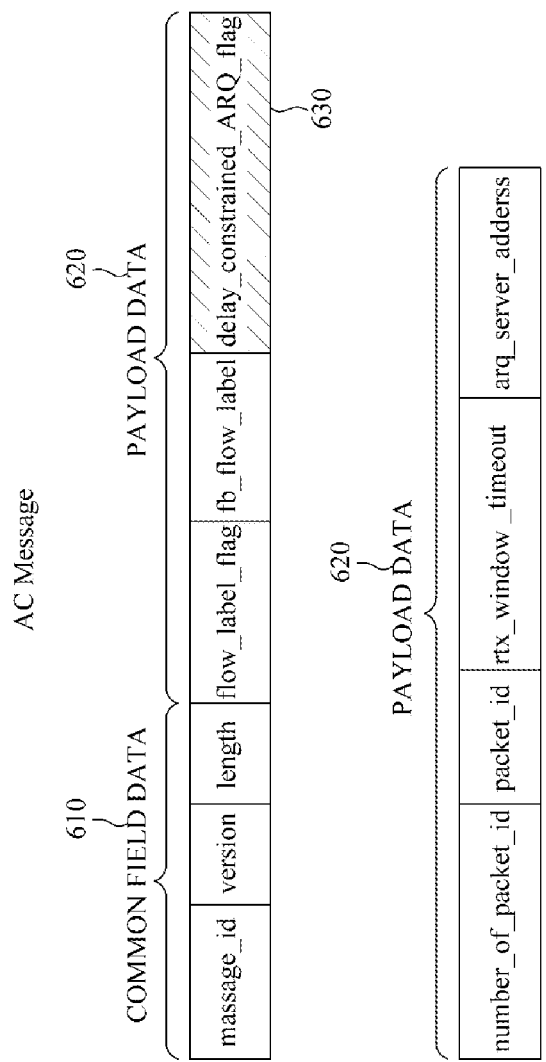
FIG. 6 is a diagram for explaining a format of an automatic repeat request (ARQ) configuration (AC) message used for a packet re-transmission method in accordance with an exemplary embodiment of the present invention.

FIG. 6 is a diagram for explaining a format of an AC message used for a packet re-transmission method in accordance with an exemplary embodiment of the present invention.

Referring to FIG. 6, an AC message may contain information about policies that may be applied in the event a packet is lost during transmission between the packet transmission apparatus and the packet receiving apparatus. At the beginning of a session, the AC message may be transmitted from the packet transmission apparatus to the packet receiving apparatus either in-band or out-of-band.

The AC message may be composed of common field data 610 and message payload data 620. The common field data 610 may include a message identifier (i.e., message_id), version data, and length data.

Here, the message identifier data may include information that identifies a certain AC message; the version data may include information that specifies the version of the AC message; and the length data may include information that specifies the length of the AC message.

The payload data 620 may include flow_label_flag. If the flow_label_flag is set to "1", the payload data includes fb_flow_label data. In addition, delay_constrained_ARQ_flag 630, packet_id, number_of_packet_id, rtx_window_timeout, and arq_server_address may also be included in the payload data.

The flow_label_flag included in the message payload data 620 contains information about whether fb_flow_label data is carried in the message, and fb_flow_label may include information that indicates a value of flow_label to be used when the packet receiving apparatus transmits an AF message.

The delay_constrained_ARQ_flag 630 may contain information regarding whether the packet transmission apparatus supports a delay-constrained ARQ function, wherein a value of the delay_constrained_ARQ_flag may be set to "1" to indicate that the packet transmission apparatus supports a delay-constrained ARQ function or set to "0" to indicate that the packet transmission apparatus does not support a delay-constrained ARQ function. The delay_constrained_ARQ_flag 630 may be 1 bit in size. The number_of_packet_id may indicate the number of packet identifiers (packet_id). The packet_id may include information about the packet's identity to distinguish a packet from other packets of assets which have different characteristics. The rtx_window_timeout may indicate a timeout of a re-transmission window, whereby the packet transmission apparatus retains packets within a transmitter buffer until the timeout has expired, and thereby the re-transmission can be performed. The arq_server_address may indicate an address of the packet transmission apparatus to which the AF message is sent to request re-transmission for a lost packet.

Format of AF message in accordance with a first exemplary embodiment

Figure 7A:
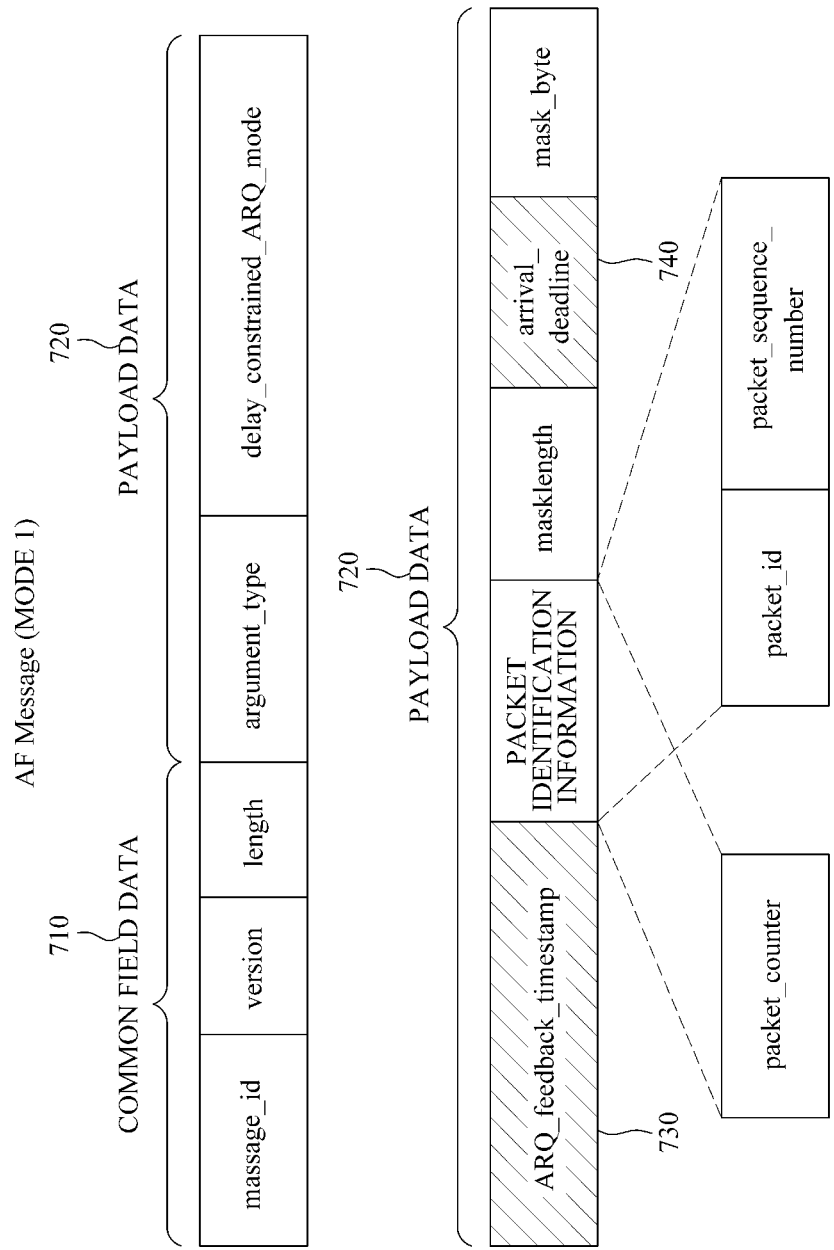
FIG. 7A is a diagram explaining a format of an ARQ feedback (AF) message used for a packet re-transmission method in accordance with a first exemplary embodiment of the present invention.

FIG. 7A is a diagram explaining a format of an ARQ feedback (AF) message used for a packet retransmission method in accordance with a first exemplary embodiment of the present invention.

Referring to FIG. 7A, a packet receiving apparatus may detect packet loss. The AF message may be generated according to information in an AC message and transmitted to a packet transmission apparatus. When the packet receiving apparatus detects the loss of one or more packets, the packet receiving apparatus may form a mask of up to 255 bytes where each bit in a byte corresponds to a sequence number of the lost packet. Up to 255×8 of lost packets may be reported in one AF message.

The AF message may consist of common field data 710 and payload data 720. Like in the AC message, the common field data 710 may contain a message identifier (message_id), version data, and length data.

The message identifier data may include information that identifies a certain AF message; version data may include information that specifies the version of the AF message; and the length data may include information that specifies the length of the AF message.

The payload data 720 may contain information regarding argument_type, delay_constrained_ARQ_mode, ARQ_feedback_timestamp 730, packet identification information (packet_counter, or both packet_id and packet_sequence_number), masklength, arrival_deadline 740, and mask_byte.

The argument_type indicates the argument type to be used when the packet receiving apparatus sends a re-transmission request to the packet transmission apparatus for lost packets. The argument_type may be used to indicate the type of packet identification information. Specifically, the argument_type may indicate whether the packet identification information, used in identifying the packet that has been requested for re-transmission, is based on the packet-counter or the packet-sequence-number. In the case of the packet-counter-based packet identification information, packet_counter is included in packet identification information field of the AF message, and in the case of packet-sequence-number-based packet identification information, both packet_id and packet_sequence_number are included in the packet identification information field. In the case of the packet-sequence-number-based packet identification information, the packet identification information field may further include number_of_packet_id (i.e., the number of packet ids of lost packets).

The delay_constrained_ARQ_mode indicates a type of delay-constrained ARQ. More specifically, it may indicate i) a delay-constrained ARQ is not considered; ii) an arrival-deadline constrained ARQ is supported; or iii) a delivery-time-constrained ARQ is supported.

i) In a mode that does not consider a delay-constrained ARQ, the packet transmission apparatus may not consider any delay constraints when re-transmitting a packet upon request. The packet receiving apparatus may select this mode according to a value of delay_constrained_ARQ_flag (which is set to "0") included in an AC message that is received from the packet transmission apparatus. In this mode, the AF message may not include the ARQ_feedback_timestamp 730, the arrival_deadline 740, or propagation_delay.

ii) In an arrival-deadline-constrained ARQ mode, the packet transmission apparatus uses ARQ_feedback_timestamp 730 and arrival_deadline 740 to determine whether to re-transmit a requested packet, wherein the packet receiving apparatus includes both the ARQ_feedback_timestamp 730 and the arrival_deadline 740 in the AF message.

iii) In a delivery-time-constrained ARQ mode, the packet transmission apparatus uses propagation_delay to determine whether to re-transmit a requested packet, wherein the packet receiving apparatus includes the propagation_delay in the AF message.

The present embodiment describes the case where the delay_constrained_ARQ_mode supports an arrival-deadline-constrained ARQ.

The ARQ_feedback_timestamp 730 that is included according to the arrival-deadline-constrained ARQ mode may indicate an NTP time at which the AF message is delivered from the packet receiving apparatus to the packet transmission apparatus, as described above. The ARQ_feedback_timestamp 730 may be 32 bits in size.

The packet identification information, as described above, may include either packet_counter or both packet_id and packet_sequence_number according to the argument_type. The packet_counter counts the number of transmitted packets, which is incremented by 1 for each transmitted packet. The packet_id is an identifier assigned to each asset in order to distinguish packets of different assets from each other. The packet_sequence_number is a sequence number of each packet that has said packet identifier, wherein packet_sequence_number included in the AF message is a field that corresponds to a packet sequence number of the first packet indicated by the mask byte as having been lost.

The masklength indicates, in bytes, a length of data following the mask_byte. The arrival_deadline 740 specifies a time by which a re-transmitted packet for the first lost packet must arrive at the packet receiving apparatus so that said apparatus can process the packet on time. This parameter is represented as a time increment starting from an ARQ_feedback_timestamp 730. The first 8 bits are determined as the integer part and the following 8 bits are determined as the fractional part. The mask_byte is a mask field, and each bit corresponds to an MMT packet.

Format of AF message in accordance with a second embodiment

FIG. 7B is a diagram explaining a format of an AF message used for a packet retransmission method in accordance with a second exemplary embodiment of the present invention.

Referring to FIG. 7B, the second embodiment describes a case where the delay_constrained_ARQ_mode indicates iii) delivery-time-constrained ARQ mode. The AF message may include common field data 750 and payload data 760, wherein the common field data 750 is the same as that of the first exemplary embodiment.

The payload data 760 may include information regarding: argument_type, delay_constrained_ARQ_mode, propagation_delay 770, packet identification information (packet_counter, or both packet_id and packet_sequence_number), masklength, arrival_deadline, and mask_byte.

The argument_type, delay_constrained_ARQ_mode, packet identification information, masklength, and mask_byte may be the same as those of the first exemplary embodiment.

Propagation_delay 770, as described above, refers to the amount of time it takes for a packet to arrive at the packet receiving apparatus from the packet transmission apparatus. The packet receiving apparatus may calculate the propagation_delay by subtracting the NTP time at the arrival time of a packet from the NTP time at the actual delivery time of the packet. The propagation_delay 770 may be an average of propagation delays measured within duration. The packet transmission apparatus may calculate an RTT and the arrival deadline by using only the propagation_delay 770, and thus may not require additional transmission of arrival deadline.

Calculation of Arrival Deadline

Figure 8A:
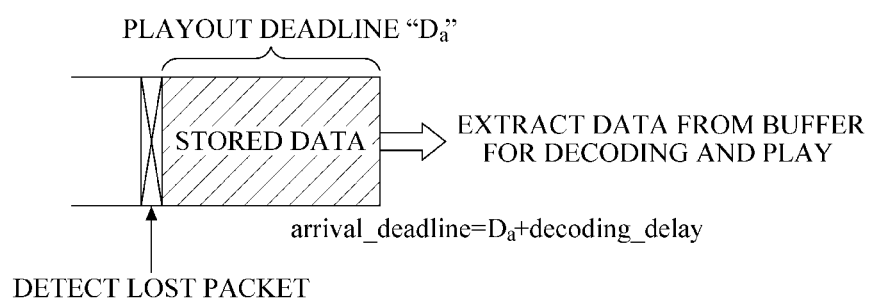
FIG. 8A is a diagram for describing a principle for calculating an arrival deadline by utilizing packet data that has already been stored in a receiver buffer in the packet re-transmission method in accordance with the first exemplary embodiment of the present invention.

FIG. 8A is a diagram for describing a principle for calculating an arrival deadline by utilizing packet data that has already been stored in a receiver buffer in the packet re-transmission method in accordance with the first exemplary embodiment.

Referring to FIG. 8A, the arrival deadline may be calculated based on an amount of data already stored in a receiver buffer, which is identified at the time of delivery of an AF message. The packet receiving apparatus may use data stored in the receiver buffer to continuously play media seamlessly for a period of a delay time caused by the re-transmission for a lost packet. Referring to FIG. 8A, additional media playout for a period of media playout deadline, $D_a$, is possible by utilizing packet data that has already been stored in the receiver buffer, thereby making it possible to increase the arrival deadline by $D_a$. Because more data stored in the receiver buffer can call for an extension of the arrival deadline, the probability of the packet transmission apparatus transmitting the lost packet is increased when the packet transmission apparatus receives the request for the re-transmission through the AF message from the packet receiving apparatus.

In addition, as shown in FIG. 8A, the media playout deadline may include a decoding delay that occurs during the media playout by the packet receiving apparatus, so that the decoding delay can be reflected in the calculation of the arrival deadline, thus making it possible to increase the arrival deadline.

In the meantime, in a real-time media transport service where packets are transmitted through a network at a relatively constant transmission rate, an arrival deadline may be estimated based on a packet transmission rate and an amount of packet data collected in the receiver buffer.

Figure 8B:
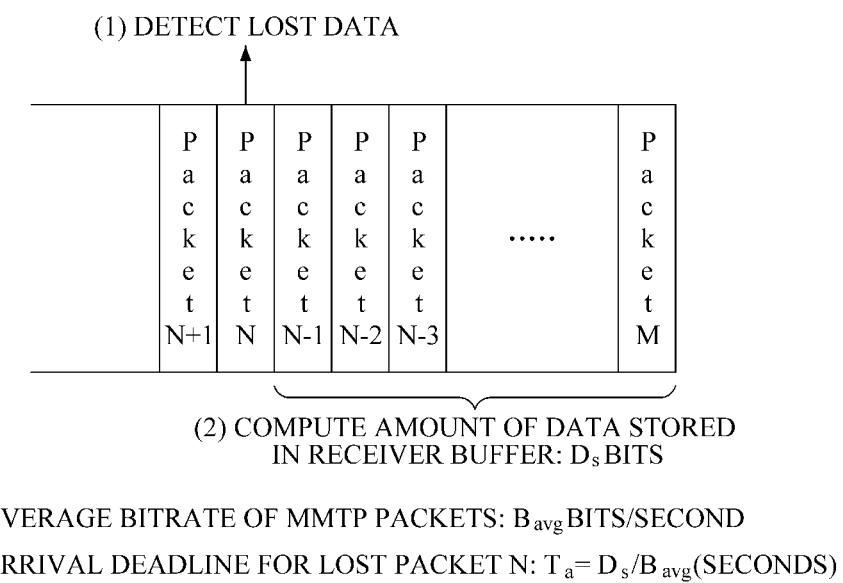
FIG. 8B is a diagram for explaining procedures for calculating an arrival deadline of a re-transmitted packet in the packet re-transmission method in accordance with the first exemplary embodiment of the present invention.

FIG. 8B is a diagram explaining procedures for calculating an arrival deadline of a re-transmitted packet in the packet re-transmission method in accordance with the first exemplary embodiment.

Referring to FIG. 8B, the calculation may include four stages: (1) a packet loss is detected; (2) a size $D_s$ of data stored in a receiver buffer is calculated while a packet requested to be re-transmitted is prepared after the detection of packet loss; (3) an average packet transmission rate $B_{avg}$ is estimated; and (4) an arrival deadline $T_a$ is calculated based on the ratio of $D_s$ to $B_{avg}$ ($D_s/B_{avg}$).

Configuration and Operation of Packet Transmission Apparatus

Figure 9:
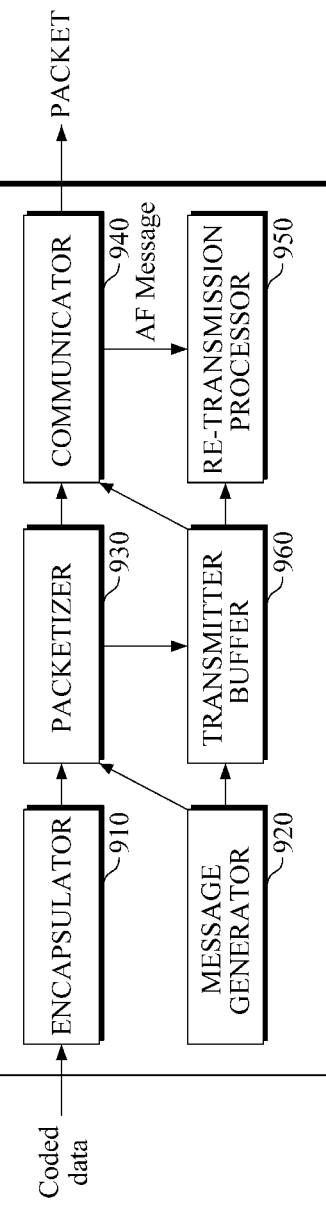
FIG. 9 is a block diagram illustrating a packet transmission apparatus in accordance with an exemplary embodiment of the present invention.

FIG. 9 is a block diagram illustrating a packet transmission apparatus in accordance with an exemplary embodiment. As shown in FIG. 9, the packet transmission apparatus may include an encapsulator 910, a message generator 920, a packetizer 930, a communicator 940, a re-transmission processor 950, and a transmitter buffer 960.

Referring to FIG. 9, the encapsulator 910 may generate a media fragment unit (MFU) based on encoded data, generate a media processing unit (MPU) based on the MFU, and generate an asset by encapsulating the MPU.

The message generator 920 creates a signaling message to be transmitted to a packet receiving apparatus. The signaling message may carry control information for controlling packet transmission/reception. For example, the signaling message transmitted by the packet transmission apparatus may include an ARQ configuration (AC) message, a measurement configuration (MC) message, an asset delivery characteristic (ADC) message, or the like. In one exemplary embodiment, the message generator 920 may create an AC message to include flag information that indicates whether to support a delay-constrained ARQ. If delay_constrained_ARQ_flag is set to "1," it means that a delay-constrained ARQ function is supported, whereas if the delay_constrained_ARQ_flag is set to "0," the delay-constrained ARQ function is not supported.

The packetizer 930 may generate an MMT packet by packetizing the MPU included in the asset. In addition, the packetizer 930 may generate an MMT packet by packetizing the signaling message that has been created by the message generator 920. The MMT packet may be stored in the transmitter buffer 960 for a certain period of time in case a packet is lost.

The communicator 940 may receive the generated MMT packets from the packetizer 930 or the transmitter buffer 960 and deliver the MMT packets to the packet receiving apparatus, and may receive a message (e.g., an AF message) from the packet receiving apparatus. More specifically, the communicator 940 may generate a communication channel to transmit and receive data through a wireless or wired network, and transmit and receive data in units of packets. The communicator 940 may include a communication processor and/or an antenna.

The re-transmission processor 950 may parse the AF message transmitted from the communicator 940 and then process a received request for re-transmission from the packet receiving apparatus. The re-transmission processor 950 may parse timing information included in the AF message related to re-transmission (e.g., information regarding at least one of ARQ_feedback_timestamp, arrival_deadline, or propagation_delay), estimate an RTT value from the parsed information, determine whether to re-transmit the requested packet by comparing the estimated RTT and the arrival deadline, and have the requested packet that is stored in the transmitter buffer 960 be properly re-transmitted via the communicator 940. Such operations will be described in detail with reference to FIG. 10.

Figure 10:
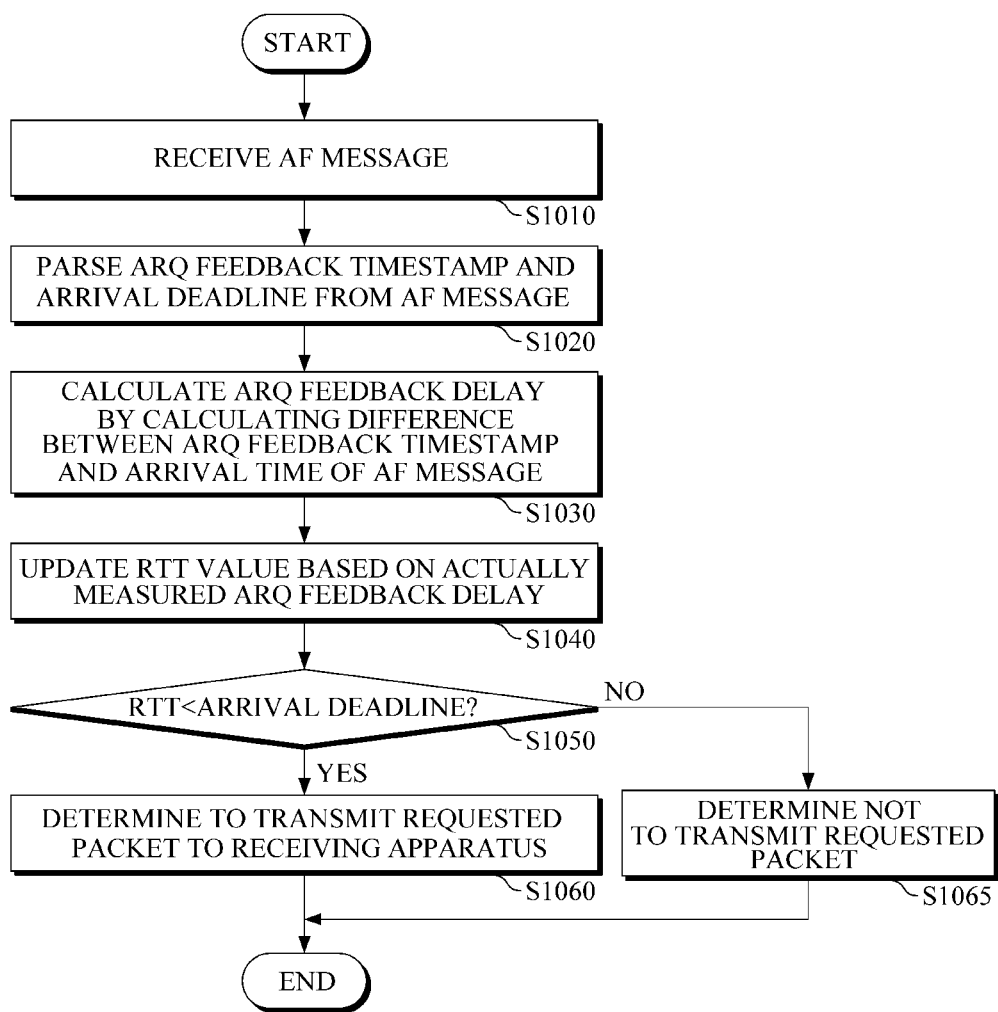
FIG. 10 is a flowchart illustrating in detail operations of a re-transmission processor of the packet transmission apparatus in accordance with the first exemplary embodiment of the present invention.

FIG. 10 is a flowchart illustrating in detail operations of the re-transmission processor of the packet transmission apparatus in accordance with the first exemplary embodiment. FIG. 10 illustrates operations of the re-transmission processor when receiving an AF message in accordance with the first exemplary embodiment.

Referring to FIG. 10, the re-transmission processor receives an AF message from the communicator in S1010. The re-transmission processor may parse the argument_type from the AF message to determine whether an ARQ is based on packet_counter or both packet_id and packet_sequence_number, and accordingly identify the packet that is requested to be re-transmitted. Moreover, the re-transmission processor parses the delay_constrained_ARQ_mode from the AF message to determine whether a delay-constrained ARQ function is supported or not, and if supported, determine whether the delay-constrained ARQ mode is an arrival-deadline-constrained ARQ mode or a delivery-time-constrained ARQ mode. The present embodiment describes a case in which an AF message of an arrival-deadline-constrained ARQ mode is received. Then, ARQ_feedback_timestamp and arrival_deadline are parsed from the AF message in S1020. The re-transmission processor calculates an ARQ feedback delay by calculating the difference between the parsed ARQ_feedback_timestamp and the actual arrival time of the AF message in S1030. Afterwards, based on the actually measured ARQ feedback delay, an RTT value is updated in S1040. The updated RTT value is then compared with the parsed arrival deadline value in S1050. If the comparison result shows that the RTT does not exceed the arrival_deadline, the re-transmission processor determines to transmit the requested packet from the transmitter buffer to the packet receiving apparatus via the communicator in S1060; if the RTT value exceeds the arrival_deadline, the re-transmission processor determines not to re-transmit the requested packet in S1065.

In the meantime, when an AF message has been received in accordance with the second exemplary embodiment, the re-transmission processor performs the same operations as the first exemplary embodiment, while checking whether the AF message is of a delivery-constrained mode, parsing only propagation_delay from the AF message instead of operation S1020. In addition, instead of operation S1030, an RTT value may be newly estimated by calculating an expected delivery time of the AF message from the packet receiving apparatus to the packet transmission apparatus based on the difference obtained by subtracting the timestamp of a packet header from an NTP time at the arrival time of the AF message that is based on the parsed propagation_delay. Thereafter, the re-transmission processor may compare the updated RTT with already-known fixed_end_to_end_delay, which is contained in an HRBM message. If the RTT does not exceed the fixed_end_to_end_delay, the re-transmission processor may determine to transmit the packet requested; if not, the re-transmission processor may determine not to transmit the requested packet.

Figure 11:
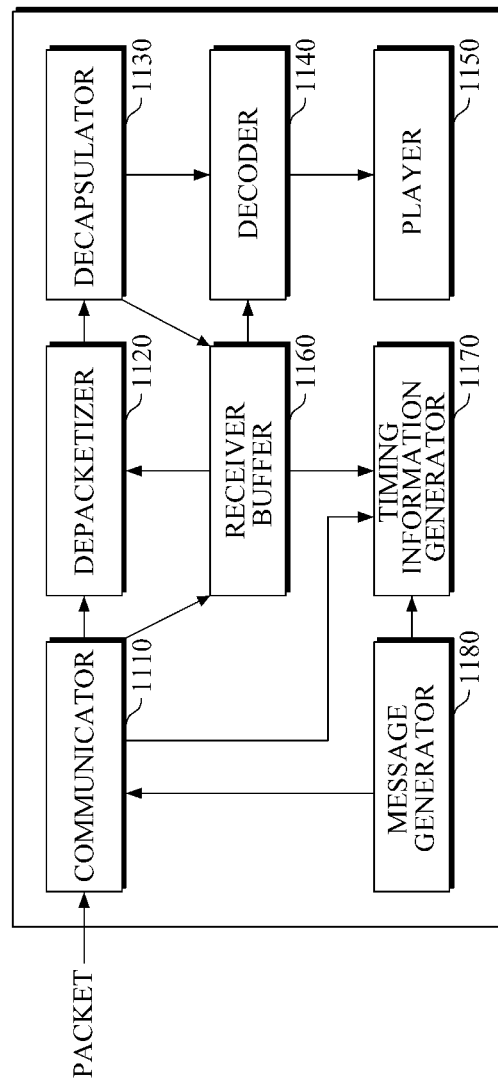
FIG. 11 is a block diagram illustrating a packet receiving apparatus in accordance with an exemplary embodiment of the present invention.

Configuration and Operation of a Packet Receiving Apparatus for Requesting Packet Re-Transmission FIG. 11 is a block diagram illustrating a packet receiving apparatus in accordance with an exemplary embodiment. As shown in FIG. 11, the apparatus may include a communicator 1110, a depacketizer 1120, a decapsulator 1130, a decoder 1140, a player 1150, a receiver buffer 1160, a timing information generator 1170, and a message generator 1180.

Referring to FIG. 11, the communicator 1110 may receive an MMT packet from a packet transmission apparatus through a wireless or wired network, and transmit a generated message to the packet transmission apparatus. Although not illustrated, a packetizer may transmit the generated message in units of packets. The communicator 1110 may be capable of both receiving and transmitting packets. The received packet may be stored in the receiver buffer 1160 for a predetermined period of time. The receiver buffer 1160 stores packets in order of reception, and may thus delete earlier stored data once storage space becomes full. The receiver buffer 1160 may retain the packets until all corresponding fragments are correctly received or until a packet that does not have the same data fragments is received. The receiver buffer 1160 may include a play buffer (not illustrated) to store decapsulated data. Once the data within the play buffer is decoded by the decoder 1140, it may be played.

The depacketizer 1120 may generate an asset or a media processing unit (MPU) by depacketizing the received packet. The depacketizer 1120 removes the packet and payload header from the received packet and extracts only the data units from a payload.

The decapsulator 1130 converts the asset into a MPU and the MPU into media fragments unit (MFU) by decapsulating the extracted data units. The depacketizer 1120 and the decapsulator 1130 may be implemented as one single entity.

The decoder 1140 may decode the decapsulated MFU, and the player 1150 may play the decoded data.

The timing information generator 1170 may generate timing information to be carried by an AF message when a packet to be received is lost. The timing information may include information regarding at least one of the following: ARQ_feedback_timestamp, arrival_deadline, and propagation_delay.

The message generator 1180 may create the AF message to include the information generated by the timing information generator 1170. The created AF message is packetized and transmitted to the packet transmission apparatus via the communicator 1110.

Figure 12:
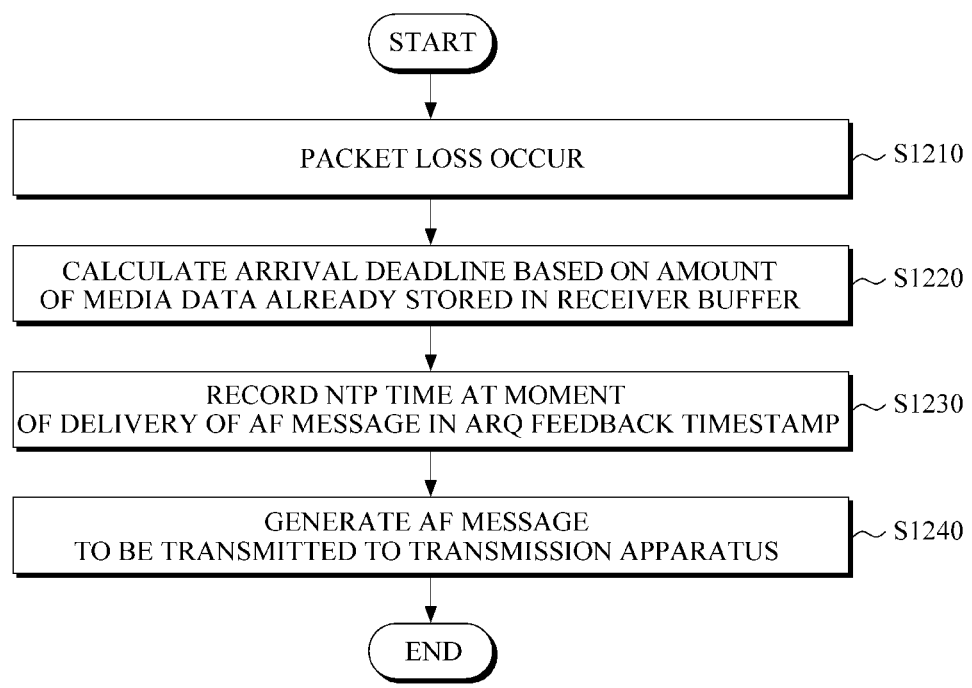
FIG. 12 is a flowchart illustrating in detail operations of a timing information generator and a message generator of the packet receiving apparatus in accordance with the first exemplary embodiment of the present invention.

FIG. 12 is a flowchart illustrating in detail operations of the timing information generator and the message generator of the packet receiving apparatus in accordance with the first exemplary embodiment. FIG. 12 shows operations of the timing information generator and message generator when an AC message has been received in accordance with the first exemplary embodiment.

Referring to FIG. 12, in the event of packet loss in S1210, the timing information generator calculates an arrival deadline in S1220 based on the amount of media data that has already been stored in a receiver buffer, in order to generate an AF message in accordance with the first exemplary embodiment. Then, an NTP time at the moment of delivery of the AF message is recorded in ARQ_feedback_timestamp in S1230. The message generator may generate the AF message based on the timing information. The message generator may include argument_type in the message. The argument_type may be set as a packet-counter-based type or a packet-sequence-number-based type. The argument_type may be stored beforehand as a setting in the packet receiving apparatus. In addition, the message formed by the message generator may include information regarding whether a delay-constrained ARQ function is supported or not. If a delay-constrained ARQ function is supported, a value that indicates whether the delay-constrained ARQ mode is an arrival-deadline-constrained mode or a delivery-time-constrained mode is also included in said message. The value for indicating the ARQ mode may be stored beforehand as a setting in the packet receiving apparatus. In the first exemplary embodiment, the delay_constrained_ARQ_mode may be set to a value that indicates an arrival-deadline-constrained ARQ mode. The AF message may be generated to include ARQ_feedback_timestamp and arrival_deadline, as along with the argument_type and delay_constrained_ARQ_mode.

Meanwhile, in the process of generating an AF message in accordance with the second exemplary embodiment, the timing information generator estimates propagation delay by calculating the difference between the NTP time at the moment of delivery of a packet to be received and the NTP time at the actual moment of packet arrival, without performing operations S1120 and S1230. The message generator may generate the AF message by setting the delay_constrained_ARQ_mode to a value that indicates a delivery-time-constrained mode and inserting the calculated propagation delay into the message.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A processing method of an MPEG media transport (MMT) packet transmission apparatus for re-transmitting a lost packet, the processing method comprising:
   transmitting an automatic repeat request (ARQ) configuration (AC) message to an MMT packet receiving apparatus, wherein the AC message comprises a delay_constrained_ARQ_flag to indicate whether the MMT packet transmission apparatus supports a delay-constrained ARQ function, the MMT packet being related with an asset; and
   in response to the delay_constrained_ARQ_flag indicating that the MMT packet transmission apparatus supports a delay-constrained ARQ function
   receiving an ARQ feedback (AF) message from the MMT packet receiving apparatus to request re-transmission of the lost packet, wherein the AF message comprises timing information, and
   determining whether to transmit the lost packet requested to be re-transmitted using the received timing information,
   wherein the ARQ feedback message includes a packet identifier that is assigned to each asset for distinguishing packets of different assets from each other.

2. The processing method of claim 1, further comprising updating a round-trip time (RTT) using the timing information, and
   wherein the determining of whether to transmit the lost packet requested to be re-transmitted is performed based on the updated RTT.

3. The processing method of claim 2, wherein the timing information comprises a propagation_delay that indicates a difference between an NTP time at a moment of delivery of a packet and an NTP time at a moment of packet arrival.

4. The processing method of claim 3, wherein the RTT is updated based on the propagation_delay, and in response to the updated RTT not exceeding a fixed_end_to_end_delay, the lost packet to be re-transmitted is transmitted to the MMT packet receiving apparatus, and in response to the updated RTT exceeding the fixed_end_to_end_delay, the lost packet to be re-transmitted is not transmitted.

5. The processing method of claim 2,
   wherein the timing information comprises an ARQ_feedback_timestamp that records a network time protocol (NTP) time that corresponds to a delivery time of the AF message and an arrival_deadline, and
   wherein the RTT is updated by calculating an ARQ feedback delay time based on a difference between the ARQ_feedback_timestamp and an arrival time of the AF message.

6. The processing method of claim 5, wherein in response to the updated RTT not exceeding the arrival_deadline, the lost packet requested to be re-transmitted is transmitted to the MMT packet receiving apparatus, and in response to the updated RTT exceeding the arrival_deadline, the lost packet to be re-transmitted is not transmitted.

7. An MPEG media transport (MMT) packet transmitting apparatus for requesting re-transmission of a lost packet, the apparatus comprising:
   a processor; and
   a memory configured to store at least one command executed by the processor,
   wherein the at least one command includes:
   a command to transmit an automatic repeat request (ARQ) configuration (AC) message to an MMT packet receiving apparatus, wherein the AC message comprises a delay_constrained_ARQ_flag to indicate whether the MMT packet transmission apparatus supports a delay-constrained ARQ function, the MMT packet being related with an asset; and
   in response to the delay_constrained_ARQ_flag indicating that the MMT packet transmission apparatus supports a delay-constrained ARQ function, a command to receive an ARQ feedback (AF) message from the MMT packet receiving apparatus to request re-transmission of the lost packet, wherein the AF message comprises timing information, and a command to determining whether to transmit the lost packet requested to be re-transmitted using the received timing information, wherein the ARQ feedback message includes a packet identifier that is assigned to each asset for distinguishing packets of different assets from each other.

8. The apparatus of claim 7, wherein the at least one command further includes a command to update a round-trip time (RTT) using the timing information, and wherein the command to determining whether to transmit the lost packet requested to be re-transmitted is performed based on the updated RTT.

9. The apparatus of claim 8, wherein the timing information comprises a propagation_delay that indicates a difference between an NTP time at a moment of delivery of a packet and an NTP time at a moment of packet arrival.

10. The apparatus of claim 9, wherein the RTT is updated based on the propagation_delay, and in response to the updated RTT not exceeding a fixed_end_to_end_delay, the lost packet to be re-transmitted is transmitted to the MMT packet receiving apparatus, and in response to the updated RTT exceeding the fixed_end_to_end_delay, the lost packet to be re-transmitted is not transmitted.

11. The apparatus of claim 8, wherein the timing information comprises an ARQ_feedback_timestamp that records a network time protocol (NTP) time that corresponds to a delivery time of the AF message and an arrival_deadline, and wherein the RTT is updated by calculating an ARQ feedback delay time based on a difference between the ARQ_feedback_timestamp and an arrival time of the AF message.

12. The apparatus of claim 11, wherein in response to the updated RTT not exceeding the arrival_deadline, the lost packet requested to be re-transmitted is transmitted to the MMT packet receiving apparatus, and in response to the updated RTT exceeding the arrival_deadline, the lost packet to be re-transmitted is not transmitted.

* * * * *